(12) United States Patent
Thackston et al.

(10) Patent No.: US 10,628,604 B1
(45) Date of Patent: Apr. 21, 2020

(54) SYSTEM AND METHOD FOR MASKING DIGITAL RECORDS

(71) Applicant: AIRLINES REPORTING CORPORATION, Arlington, VA (US)

(72) Inventors: Chuck Thackston, Louisville, KY (US); Tracy Romano, Alexandria, VA (US); Vincent Smith, Gainesville, VA (US)

(73) Assignee: AIRLINES REPORTING CORPORATION, Arlington, VA (US)

( * ) Notice: Subject to any disclaimer, the term of this patent is extended or adjusted under 35 U.S.C. 154(b) by 157 days.

(21) Appl. No.: 15/800,464

(22) Filed: Nov. 1, 2017

Related U.S. Application Data

(60) Provisional application No. 62/415,642, filed on Nov. 1, 2016.

(51) Int. Cl.
*G06F 21/62* (2013.01)
*G06F 7/58* (2006.01)

(52) U.S. Cl.
CPC ............ *G06F 21/6227* (2013.01); *G06F 7/58* (2013.01)

(58) Field of Classification Search
CPC ................................ G06F 21/6227; G06F 7/58
See application file for complete search history.

(56) References Cited

U.S. PATENT DOCUMENTS

| 7,882,134 | B2* | 2/2011 | Pattabhi | G06F 16/217 |
| | | | | 707/791 |
| 8,924,401 | B2* | 12/2014 | Raj | H04L 9/0894 |
| | | | | 707/757 |
| 9,258,112 | B2* | 2/2016 | Aggarwal | H04L 9/0816 |
| 9,720,943 | B2* | 8/2017 | Mattsson | G06F 16/221 |
| 9,886,593 | B2* | 2/2018 | Mushkatblat | G06F 21/6254 |
| 2014/0019467 | A1* | 1/2014 | Itoh | G06F 21/6227 |
| | | | | 707/757 |
| 2016/0012238 | A1* | 1/2016 | Ioannidis | H04L 9/008 |
| | | | | 713/189 |

\* cited by examiner

*Primary Examiner* — Michael R Vaughan
(74) *Attorney, Agent, or Firm* — Foley & Lardner LLP

(57) ABSTRACT

Systems and methods of masking data are provided. A data masking server obtains a plurality of digital records and groups the plurality of digital records into a plurality of groups based on predetermined criteria. The data masking server generates a plurality sets of masking factors. Each set includes a predetermined number of random numbers as the masking factors. The data masking server generates a high limit value and a low limit value for a group of digital records. The data masking server randomly selects a set of masking factors. The data masking server randomly selects a random number from the randomly selected set of masking factors. The data masking server masks data contained in a digital record in the group of digital records based on the high limit value, the low limit value, and the randomly selected random number.

20 Claims, 16 Drawing Sheets blue curve: average of O&D_ProRated_Fare
orange curve: average of Month Adj blue curve: average of O&D_ProRated_Fare
orange curve: average of Month Adj

US 10,628,604 B1

SYSTEM AND METHOD FOR MASKING DIGITAL RECORDS

RELATED APPLICATIONS

The present application claims priority to U.S. Provisional Patent Application No. 62/415,642, titled "SYSTEM AND METHOD FOR MASKING DIGITAL RECORDS" and filed on Nov. 1, 2016, the entire contents of which are hereby incorporated by reference for all purposes.

FIELD

The present disclosure relates generally to data masking, including, but not limited to masking information contained in digital records using randomly generated masking factors.

BACKGROUND

In the age of the Internet, each day enormous amount of data are generated and processed. Among those data, some are personal sensitive or commercially sensitive data. For example, a hospital may generate and maintain data relating to patience's personal and medical information. Thus, it is important to protect the sensitive information while being able to properly utilizing those data for legitimate purposes. However, with the advance of computer technologies, it becomes more and more difficult to protect the personal and commercially sensitive information from reverse engineering.

SUMMARY

According to one or more aspects of the present disclosure, a computer-implemented method of masking data includes obtaining, by a data masking server including at least one processor, a plurality of digital records associated with events within a predetermined time period. The method includes grouping, by the data masking server, the plurality of digital records into a plurality of groups of digital records based on predetermined criteria. The method includes generating, by the data masking server, a plurality sets of masking factors, wherein each set includes a predetermined number of random numbers as the masking factors. The method includes generating, by the data masking server, a high limit value and a low limit value for a group of digital records among the plurality of groups of digital records. The method includes randomly, by the data masking server, selecting a set of masking factors among the generated plurality sets of masking factors. The method includes randomly, by the data masking server, selecting a random number from the randomly selected set of masking factors. The method includes masking, by the data masking server, an amount contained in a first digital record in the group of digital records based on the high limit value, the low limit value, and the randomly selected random number from the randomly selected set of masking factors.

In some implementations, the events are associated with airline records, and wherein the amount contained in the first digital record comprises numerical data associated with an airline record. In some implementations, generating the plurality sets of masking factors includes generating a set of masking factors using a predetermined mean and a predetermined standard deviation over a normal distribution.

In some implementations, the method includes determining that the amount contained in the first digital record is below the high limit value and above the low limit value and generating a masked amount for the amount contained in the first digital record by applying the randomly selected random number from the randomly selected set of masking factors to the amount contained in the first digital record.

In some implementations, the method includes determining that an amount contained in a second digital record in the group of digital records is above the high limit value and generating a masked amount for the amount contained in the second digital record by setting the masked amount to the high limit value.

In some implementations, the method includes determining that an amount contained in a third digital record in the group of digital records is below the low limit value and generating a masked amount for the amount contained in the third digital record by setting the masked amount to the low limit value.

In some implementations, the plurality of digital records are grouped based on a combination of an origin-and-destination criterion and a cabin class criterion in the plurality of digital records.

According to another aspect of the present disclosure, a system of masking data includes at least one server including one or more processors coupled to memory, the at least one server configured to obtain a plurality of digital records associated with events within a predetermined time period; group the plurality of digital records into a plurality of groups of digital records based on predetermined criteria; generate a plurality sets of masking factors, wherein each set includes a predetermined number of random numbers as the masking factors; generate a high limit value and a low limit value for a group of digital records among the plurality of groups of digital records; randomly select a set of masking factors among the generated plurality sets of masking factors; randomly select a random number from the randomly selected set of masking factors; and mask an amount contained in a first digital record in the group of digital records based on the high limit value, the low limit value, and the randomly selected random number from the randomly selected set of masking factors.

In some implementations, the events are associated with airline records, and wherein the amount contained in the first digital record comprises numerical data associated with an airline record. In some implementations, generating the plurality sets of masking factors includes generating a set of masking factors using a predetermined mean and a predetermined standard deviation over a normal distribution.

In some implementations, the server is further configured to determine that the amount contained in the first digital record is below the high limit value and above the low limit value and generate a masked amount for the amount contained in the first digital record by applying the randomly selected random number from the randomly selected set of masking factors to the amount contained in the first digital record.

In some implementations, the server is further configured to determine that an amount contained in a second digital record in the group of digital records is above the high limit value and generate a masked amount for the amount contained in the second digital record by setting the masked amount to the high limit value.

In some implementations, the server is further configured to determine that an amount contained in a third digital record in the group of digital records is below the low limit value and generate a masked amount for the amount contained in the third digital record by setting the masked amount to the low limit value.

In some implementations, the plurality of digital records are grouped based on a combination of an origin-and-destination criterion and a cabin class criterion in the plurality of digital records.

According to another aspect, a non-transitory computer-readable medium having machine instructions stored therein, the instructions when executed by at least one processor, causing the at least one processor to perform operations include obtaining a plurality of digital records associated with events within a predetermined time period; grouping the plurality of digital records into a plurality of groups of digital records based on predetermined criteria; generating a plurality sets of masking factors, wherein each set includes a predetermined number of random numbers as the masking factors; generating a high limit value and a low limit value for a group of digital records among the plurality of groups of digital records; randomly selecting a set of masking factors among the generated plurality sets of masking factors; randomly selecting a random number from the randomly selected set of masking factors; and masking an amount contained in a first digital record in the group of digital records based on the high limit value, the low limit value, and the randomly selected random number from the randomly selected set of masking factors.

In some implementations, the events are associated with airline records, and wherein the amount contained in the first digital record comprises numerical data associated with an airline record. In some implementations, the instructions when executed by the at least one processor, cause the at least one processor to perform operations further comprising generating a set of masking factors using a predetermined mean and a predetermined standard deviation over a normal distribution. In some implementations, the instructions when executed by the at least one processor, cause the at least one processor to perform operations further comprising determining that the amount contained in the first digital record is below the high limit value and above the low limit value and generating a masked amount for the amount contained in the first digital record by applying the randomly selected random number from the randomly selected set of masking factors to the amount contained in the first digital record.

In some implementations, the instructions when executed by the at least one processor, cause the at least one processor to perform operations further comprising determining that an amount contained in a second digital record in the group of digital records is above the high limit value; generating a masked amount for the amount contained in the second digital record by setting the masked amount to the high limit value; determining that an amount contained in a third digital record in the group of digital records is below the low limit value; and generating a masked amount for the amount contained in the third digital record by setting the masked amount to the low limit value.

In some implementations, the plurality of digital records are grouped based on a combination of an origin-and-destination criterion and a cabin class criterion in the plurality of digital records.

BRIEF DESCRIPTION OF THE DRAWINGS

Various objects, aspects, features, and advantages of the exemplary embodiments and implementations of the disclosure will become more apparent and better understood by referring to the detailed description taken in conjunction with the accompanying drawings.

Figure 1:
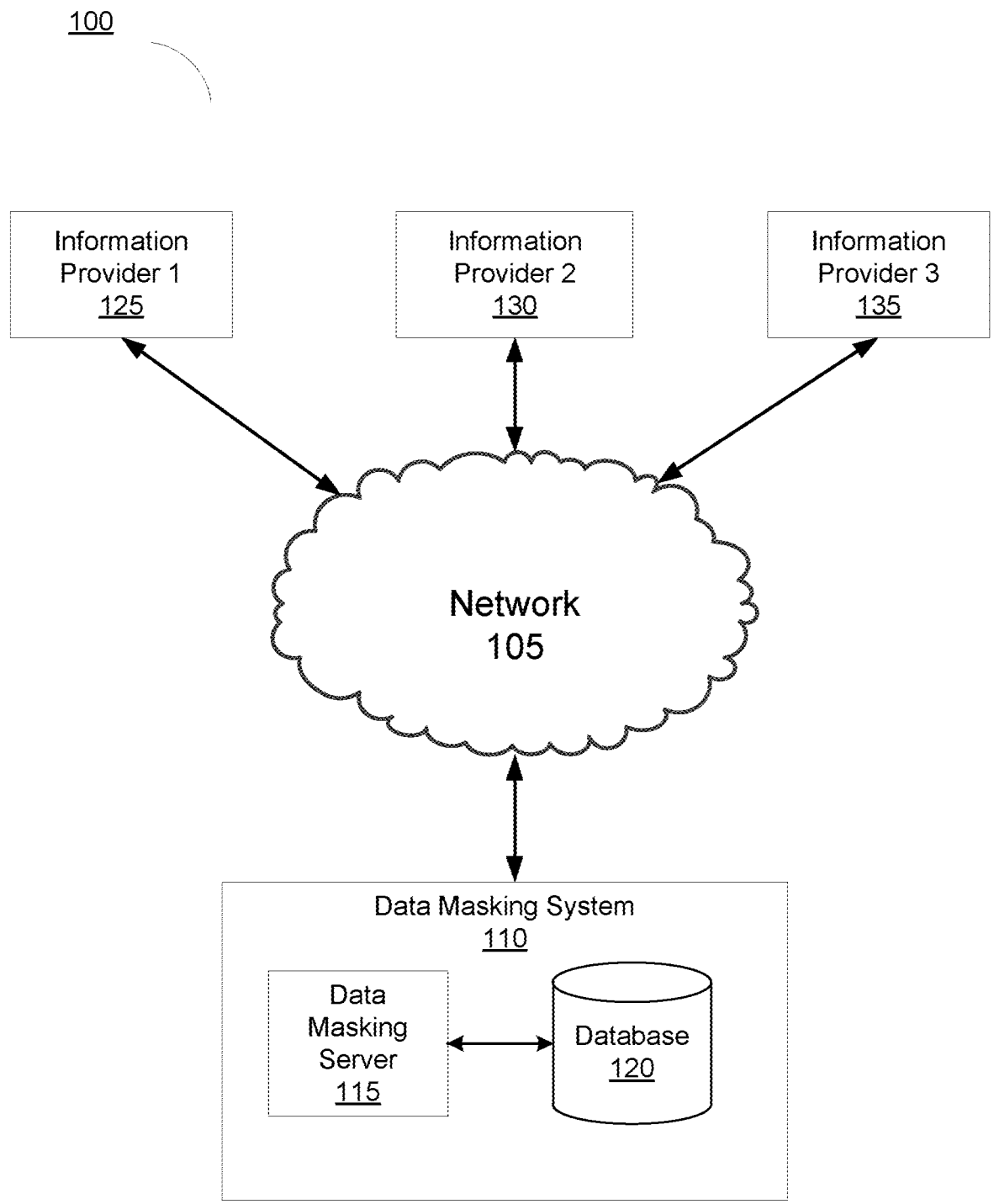
FIG. 1 is a block diagram depicting an example system for masking data, according to an illustrative implementation.

The details of various implementations of the methods and systems are set forth in the accompanying drawings and the description below.

DETAILED DESCRIPTION

Following below are more detailed descriptions of various concepts related to, and implementations of, methods, apparatuses, and systems of data masking in a computer networking environment. Before turning to the more detailed descriptions and figures, which illustrate the exemplary implementations in detail, it should be understood that the application is not limited to the details or methodology set forth in the descriptions or illustrated in the figures. It should also be understood that the terminology is for the purpose of description only and should not be regarded as limiting.

The present disclosure is directed generally to systems and methods of masking data using a plurality sets of randomly generated masking factors. The systems and methods described herein can solve the technical problems in terms of maintaining the integrity of sensitive data without revealing the underlying actual data that other systems and methods may not be able to solve. In addition, by masking the data using a plurality sets of randomly generated masking factors, the systems and methods described herein can improve the security of sensitive data and reduce the risk of sensitive data being exposed in the event that the data is accessed by an entity that is not entitled to be privy to the data.

The present disclosure can be implemented in environments where data is transmitted between devices of different entities, where one entity is not entitled to access the contents of the data for one or more reasons, including, to maintain the data or its contents in confidence. In some implementations, a method can randomly adjust numerical data or values, for instance, readings from one or more sensors monitoring outputs of a particular facility. In some implementations, the readings from sensors may be sensitive, proprietary or confidential data that an owner of the data may wish to keep confidential. In some implementations, the sensor data may include temperature levels, carbon dioxide levels, humidity levels, among others. These readings may be aggregated by polling sensors periodically and stored as transactions or events.

In another example, weights or other physiological measurements (for instance, blood pressure levels, hemoglobin levels, A1C levels) of patients in a hospital setting may be aggregated and masked to maintain confidentiality of patients due to regulatory requirements. The patients may be pooled in different categories or classes, based on patient profiles. In some implementations, the patients may be pooled in different categories based on which arm of a clinical trial the patients are assigned to. Patients assigned to a control arm may be classified in one category, while patients assigned to an experimental arm may be assigned to another category. Their physiological measurements can be monitored, calculated, measured or otherwise recorded periodically over time and the data can be masked using the techniques described herein while satisfying the confidentiality requirements imposed by health regulations.

In some implementations, a method can randomly adjust fares, within a +/−X % range. In some implementations, this method can mask individual fares, but with a relatively small population (e.g., less than 50 transactions in most cases, but depending on the distribution of fares). It may regress the average of the adjusted fares to the average of the actual fares with a very high confidence level.

In some implementations, a method can calculate a moving average over X number of issue dates. For populations with a high concentration of a single airline, this method can be used by that airline to closely estimate actual fares. The airline with a high concentration of ticket transactions will be able to extract most of the actual fares for its own airline from the moving average. Once that is done, interpolation of the actual fares of the small number of airlines remaining in the population can then be done.

In some implementations, a method can adjust moving average over X issue dates by a +/−X % range. This method can mask the fares to such an extent as it will become practically useless for analysis within a relatively short window of time. In order for the masked fares to be useful for analysis, the analysis period would have to be very long and usually over many months or years. For many analysis use-cases, this is not practical.

In some implementations, a method can adjust fares in aggregate based solely on a single dimension (e.g., issue date). A method of averaging or adjusting fares may be effective at some level for analysis of a single dimension, but may fail for other analysis. For example, if the method is averaged for the issue date, analysis based on the issue date may still be feasible in some cases. However, if the analysis is attempted on departure date, cabin class, or other dimensions, the analysis will be skewed and potentially useless because the averages are not done over that dimension.

The systems and methods described herein can solve the technical difficulties presented with other methods while still retaining sufficient masking properties to protect confidential data. By masking confidential data, even in the event of a security breach or if an unauthorized party accesses the confidential data, the data remains safe due to the manner in which the data is algorithmically manipulated. For example, the confidential data can include airline proprietary information of actual ticket transaction amounts. According to the systems and methods described herein, adjustments can be applied to individual transactions without grouping or aggregating transactions on any one dimension. Furthermore, adjustment factors can be randomly selected over a large population of possible factors (e.g., 10,000) to make reverse engineering the factor distribution impractical or impossible. Moreover, distribution of adjustment factors within a set of ticket transactions may not cluster around a mean of zero, and thus providing sufficient deviation from an actual average so that actual fares cannot be determined by other airlines. According to the systems and methods described herein, adjustment factor sets can be recalculated on a periodic (e.g., quarterly) basis so that even with a very large population, the factors could not be exactly reverse engineered. Outlier high and low value fares can be adjusted around an amount equal to a high-limit value or a low-limit value to better normalize analysis across the population. Hereinafter, the terms "adjustment factors" and "masking factors" are used interchangeably and generally have the same meaning.

FIG. 1 is a block diagram depicting an example system 100 for masking data. The system 100 includes a data masking system 110 communicating with a plurality of information provider devices 125, 130, 135 via a network 105. The data masking system 110 can include one or more servers 115, such as a data masking server 115, and one or more databases 120. The data masking server 115 can include one or more processors and a memory, as described further herein below in relation to FIG. 2. The databases 120 can be local to the data masking system 110 or can be remote to the data masking system 110 and communicates with the data masking system 110 via the network 105. The databases 120 can store digital records or other information used by the data masking system 110.

The network 105 can include any computer networks or communications networks through which information can be transmitted and received. For example, the network 105 can include a local area network (LAN) such as a WiFi network, a wide area network (WAN), a wired or wireless telecommunications network, a television network, a radio network, a satellite network, a cellular network, the Internet, and any other medium through which information can be communicated. In some implementations, the data masking system 110 can communicate with one or more information providers 125, 130 or 135 via the network using standard communication protocols. In some implementations, SSH File Transfer Protocol, or Secure File Transfer Protocol (SFTP) may be used to communicate via the network 105. In some implementations, Sterling File Gateway, or iiNet may be used to facilitate communications between the information providers 125, 130 or 135 and the data masking system 110 over the network 105.

The plurality of information provider devices 125, 130 and 135 can include any computing devices, such as desktops, laptops, workstations, server devices, and portable devices that can be handheld, such as smart phones, tablets, personal digital assistants, etc. The information provider devices 125, 130 and 135 can be devices of entities or individuals that can provide information for use by the data masking system 110. In some implementations, the information provider devices 125, 130 and 135 can be devices associated with travel carriers (e.g., airlines), travel agencies, or other entities that can provide information of airline ticket fares. In some implementations, information of airline ticket fares can be transmitted from the information provider devices 125, 130 and 135 via the network 105 to the data masking system 110 and stored in the database 120. In some implementations, the information can be transmitted using a user interface displayed on the information provider devices 125, 130 or 135 to the data masking system 110.

Figure 2:
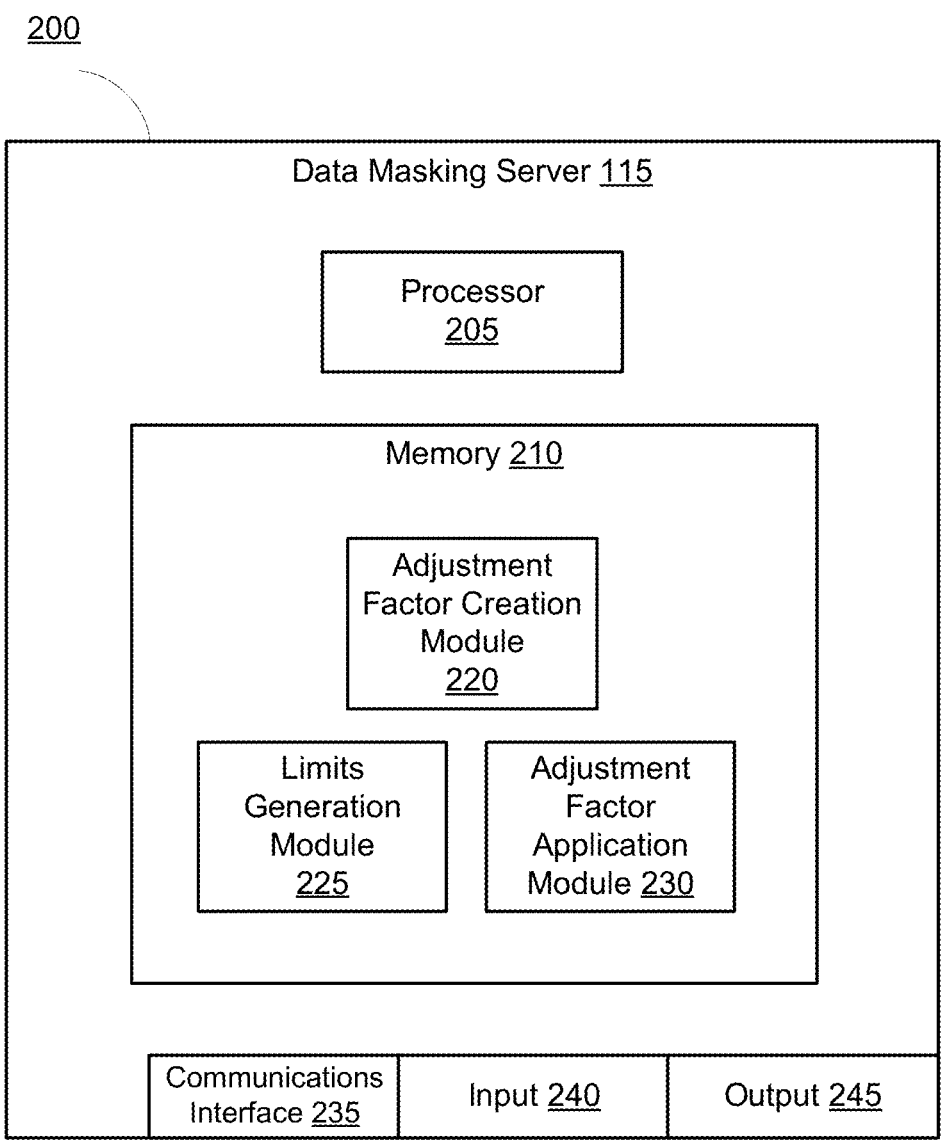
FIG. 2 is a block diagram depicting an example apparatus for masking data, according to an illustrative implementation.

FIG. 2 is a block diagram depicting an example apparatus 200, such as the data masking server 115, for masking data. The data masking server 115 can include a processor 205, a memory 210, a communications interface 235, an input 240, and an output 245. The processor 205 can be one or more microprocessors, application specific integrated circuits (ASICs), CPUs, and/or one or more other integrated circuits. The processor 205 can execute instructions stored in non-transitory computer-readable media for performing operations described herein.

The memory 210 can include any type of computer memory or electronic storage device capable of providing the processor 205 with program instructions and can include hard disk, floppy disk, memory registers, tapes, CD-ROM, DVD, magnetic disk, memory chip, flash memory, read-only memory (ROM), random-access memory (RAM), optical media, etc. The memory 210 can be a non-transitory memory used to store computer-readable instructions that, when executed by the processor, cause the processor to perform the operations described herein. For example, the memory 210 is shown to include an adjustment factor creation module 220, a limits generation module 225, and an adjustment factor application module 230. A module can be a logical collection of computer executable instructions which can be called upon to carry out a particular operation. In some implementations, one or more of these modules can be implemented in firmware or hardware. In some implementations, the modules 220-230 can be implemented in one apparatus, such as the data masking server 115. In other implementations, each of the modules 220-230 can be implemented in different and separate apparatuses and/or executed by different and separate processors, or a combination thereof.

The communications interface 235 allows the data masking server 115 to communicate with the database 120 and devices in the network 105 by transmitting and receiving packets. For example, the communications interface 235 can include one or more network interface cards, which provide hardware interfaces between the data masking server 115 and the network 105. The communications interface 235 can utilize one or more Application Programming Interfaces (API) to receive or retrieve data from one or more data stores, including but not limited to data stores of third-party systems that are accessible via the one or more APIs. The data masking server 115 can also include an input device 240 and an output device 245. For example, the input device 240, such as a pointing device, a keyboard, a touchscreen, or another form of input device, can allow users to input information. The output device 245 allows various information to be viewed or otherwise perceived in connection with execution of the instructions. The data masking server 115 can also include other components such as a bus, a storage device, etc.

In some implementations, the data masking server 115 can perform the data masking operations as described herein. For example, when executed by the processor 205, the adjustment factor creation module 220, the limits generation module 225, and the adjustment factor application module 230 can cause the data masking server 115 to perform the data masking operations. In brief overview, the data masking operations can include three major operations: (A) creation of adjustment factor sets on a periodic basis; (B) generation of high-limit and low-limit values on a periodic basis; and (C) application of adjustments to transactions.

(A) Creation of adjustment factor sets on a periodic basis.

In some implementations, the adjustment factor creation module 220 can be configured to create adjustment factor sets on a periodic basis. In some implementations, this process can be done multiple times to create a range of possible adjustment factors. For example, the calculation process can be done 72 times to create a set of 72 unique variations of adjustment factors. Continuing with this example, the process can first generate a set of N random numbers with a mean (M) of 0 and one of six different standard deviation values (SD) over a normal distribution. For example, the six SD values can be 0.025, 0.035, 0.045, 0.055, 0.065, and 0.075, and N can be 10,000 with M=0.

For instance, sample data for one of the sets of random numbers is shown in Table 1 with a mean (M)=0, a standard deviation (SD)=0.025, and the number (N) of random numbers=20.

TABLE 1

| |
|---|
| −0.008925 |
| −0.013121 |
| 0.011466 |
| −0.007690 |
| −0.051349 |
| 0.007011 |
| 0.001793 |
| 0.001361 |
| −0.009515 |
| 0.019024 |
| −0.018724 |
| 0.020208 |
| 0.005588 |
| 0.002065 |
| 0.018664 |
| −0.036318 |
| 0.032042 |
| −0.008197 |
| −0.022838 |
| −0.010006 |

Continuing with the above example, for each set of standard deviation values, 12 individual sets of adjustment factors can be created by adjusting the random values created in the first step by 12 different factors (F). For instance, F can be: −0.20, −0.18, −0.16, −0.14, −0.12, −0.10, 0.10, 0.12, 0.14, 0.16, 0.18, and 0.20. In this example, the use of 6 standard deviation values and 12 F values produces 72 sets. However, it should be understood that those values could be adjusted depending on the specific fare adjustment requirements.

As an example, a partial set of adjustment factors is illustrated in Table 2 with the first column being the random numbers generated and the other 4 columns with examples of adjustment factors of various F values.

TABLE 2

| | F = −0.18 | F = −0.10 | F = 0.12 | F = 0.16 |
|---|---|---|---|---|
| 0.124872 | −0.055128 | 0.024872 | 0.244872 | 0.284872 |
| 0.173983 | −0.006017 | 0.073983 | 0.293983 | 0.333983 |
| 0.126796 | −0.053204 | 0.026796 | 0.246796 | 0.286796 |
| 0.185416 | 0.005416 | 0.085416 | 0.305416 | 0.345416 |
| 0.148254 | −0.031746 | 0.048254 | 0.268254 | 0.308254 |
| 0.138091 | −0.041909 | 0.038091 | 0.258091 | 0.298091 |
| 0.061424 | −0.118576 | −0.038576 | 0.181424 | 0.221424 |
| 0.127797 | −0.052203 | 0.027797 | 0.247797 | 0.287797 |
| 0.075962 | −0.104038 | −0.024038 | 0.195962 | 0.235962 |
| 0.110719 | −0.069281 | 0.010719 | 0.230719 | 0.270719 |
| 0.122355 | −0.057645 | 0.022355 | 0.242355 | 0.282355 |
| 0.019426 | −0.160574 | −0.080574 | 0.139426 | 0.179426 |
| 0.136232 | −0.043768 | 0.036232 | 0.256232 | 0.296232 |
| 0.107280 | −0.072720 | 0.007280 | 0.227280 | 0.267280 |
| 0.089872 | −0.090128 | −0.010128 | 0.209872 | 0.249872 |
| 0.024231 | −0.155769 | −0.075769 | 0.144231 | 0.184231 |
| 0.027568 | −0.152432 | −0.072432 | 0.147568 | 0.187568 |
| 0.097150 | −0.082850 | −0.002850 | 0.217150 | 0.257150 |
| 0.143070 | −0.036930 | 0.043070 | 0.263070 | 0.303070 |
| 0.106107 | −0.073893 | 0.006107 | 0.226107 | 0.266107 |
| 0.107552 | −0.072448 | 0.007552 | 0.227552 | 0.267552 |
| 0.140018 | −0.039982 | 0.040018 | 0.260018 | 0.300018 |
| 0.066136 | −0.113864 | −0.033864 | 0.186136 | 0.226136 |
| 0.002508 | −0.177492 | −0.097492 | 0.122508 | 0.162508 |
| 0.112871 | −0.067129 | 0.012871 | 0.232871 | 0.272871 |
| 0.073720 | −0.106280 | −0.026280 | 0.193720 | 0.233720 |
| 0.080899 | −0.099101 | −0.019101 | 0.200899 | 0.240899 |
| 0.060653 | −0.119347 | −0.039347 | 0.180653 | 0.220653 |
| 0.146317 | −0.033683 | 0.046317 | 0.266317 | 0.306317 |
| 0.077063 | −0.102937 | −0.022937 | 0.197063 | 0.237063 |

In the example of Table 2 above, the mean (M)=0, the standard deviation (SD)=0.035, and the number (N) of random numbers=30, and the factor (F)=−0.18, −0.10, 0.12, 0.16.

Figure 3:
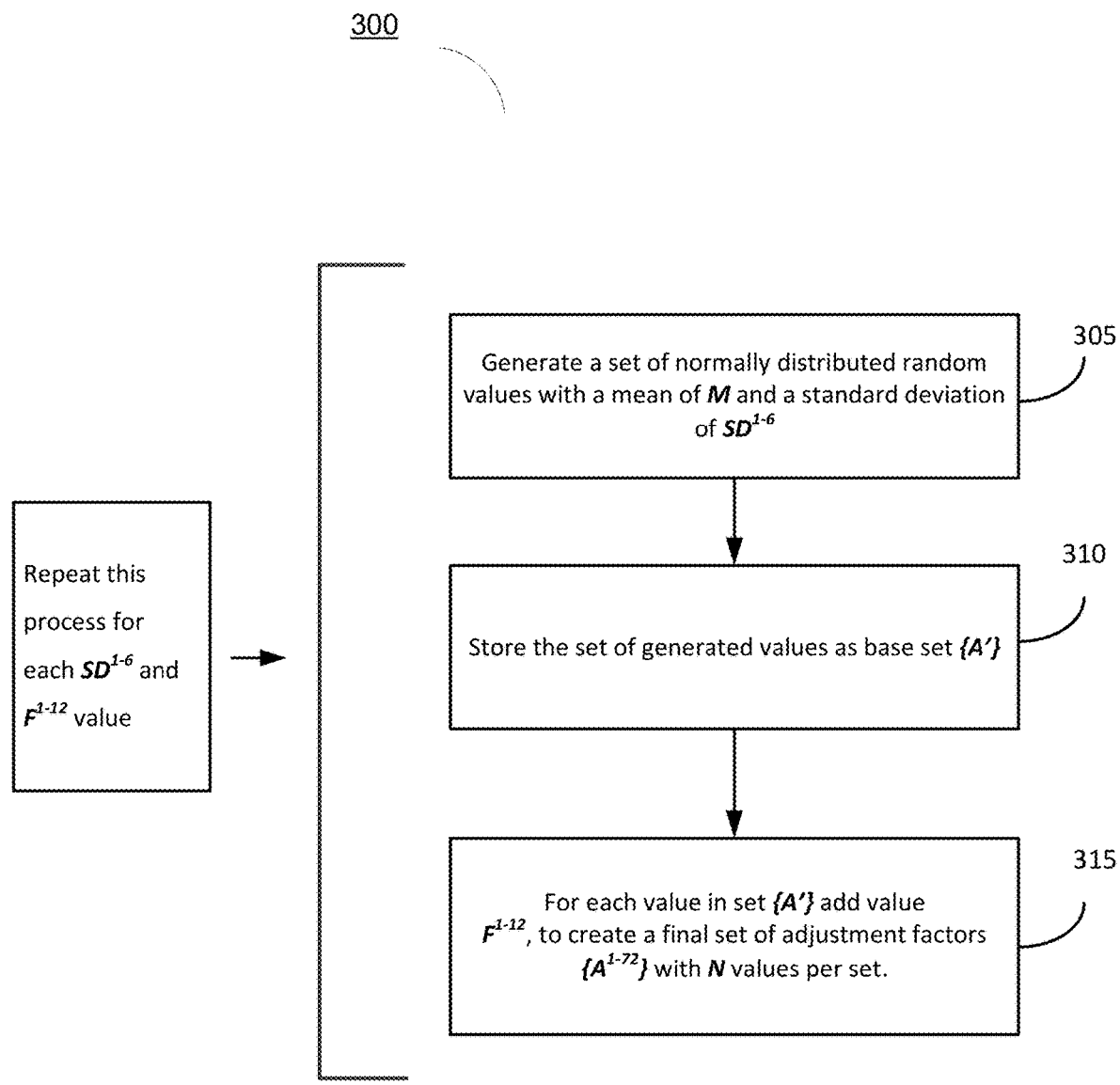
FIG. 3 is a flow diagram depicting an example process of generating a plurality sets of random adjustment factors, according to an illustrative implementation.

FIG. 3 is a flow diagram depicting an example process 300 of generating a plurality sets of random adjustment factors. At operation 305, the process 300 generates a set of normally distributed random values with a mean of M and a standard deviation of $SD^{1-6}$. For example, the adjustment factor creation module 220 can be configured to generate a set of normally distributed random values with a mean of 0 and a standard deviation of 0.025, in relation to the example above. At operation 310, the process 300 stores the set of generated values as base set {A'}. For example, the adjustment factor creation module 220 can be configured to store the set of generated values as base set {A'} to the memory 210 of the data masking server 115 or the database 120 of the data masking system 110. At operation 315, the process 300 adds, for each value in the set {A'}, a value of the factor $F^{1-12}$ to create a final set of adjustment factors {$A^{1-72}$} with N values per set. For example, the adjustment factor creation module 220 can be configured to add, for each value in the set {A'}, a value of the factor $F^{1-12}$ (e.g., −0.20 in the example above) to create a final set of adjustment factors {$A^{1-72}$} with N (e.g., 10,000) values per set. The process 300 repeats the operations 305, 310, and 315 for each $STY^{-6}$ and $F^{1-12}$ value. For example, the adjustment factor creation module 220 can be configured to repeat the operations 305, 310, and 315 until all 72 sets of adjustment factors are generated. In other words, continuing with the above example, the process 300 can generate 6 base sets for each of the six standard deviations (0.025, 0.035, 0.045, 0.055, 0.065, and 0.075). Then within each base set, the process 300 can generate 12 final sets using the factor F (−0.20, −0.18, −0.16, −0.14, −0.12, −0.10, 0.10, 0.12, 0.14, 0.16, 0.18, and 0.20). Note that M (=0) and N will be constant for all iterations of the process in these implementations. Each iteration can create a set of adjustment factors ({A″}) that can be used to adjust actual fares during the adjustment process.

It should be understood that the numbers and values relating to the standard deviations (SD), the factor (F), the mean (M), and the number (N) in the above implementation and example are for illustrative purposes. More, less, and different numbers and values can be used in different implementations.

(B) Generation of high-limit and low-limit values on a periodic basis.

In some implementations, the limits generation module 225 can be configured to generate high-limit and low-limit values on a periodic basis. In some implementations, this process can be done for each combination of first and second factor pairs (for instance, origin-and-destination) and a third factor (for instance, cabin class) in the population. This process can also be used with other combinations of factors such as ticketing airline or system provider. As an example, assuming 4 cabin classes are used for determination of the high-limit and low-limit values: First (F); Business (C); Economy (Y); and Discount Economy (DY).

In some implementations, the full calculation of the high-limit and low-limit values can be done on a monthly basis to maintain relatively accurate values based on fare changes over time. In some implementations, the calculation of high-limit and low-limit values can be based on a six-month moving average to normalize for expected seasonality in fares. For example, within the population of fares for each cabin (CB) and origin-and-destination (O&D), the high-limit value ($HL^x$) may be a number based on a continuous percentile calculation such that most fares are less than the high-limit value. The high-limit percentile value is referred to as ($p^H$). For example, at the 95$^{th}$ percentile ($p^{95}$), 95% of all the fares are lower than the high-limit value. The low-limit value ($LL^x$) may be a number based on a continuous percentile calculation such that most fares are more than the low-limit value. The low-limit percentile value is referred to as ($p^L$). For example, at the 5$^{th}$ percentile ($p^5$), only 5% of all the fares are lower than the low-limit value.

In some implementations, for actual fares that are negative (e.g., refund transaction amounts), the high-limit and low-limit values may be a corresponding negative value, but not separately calculated as the population of negative value fares is significantly smaller.

Figure 4:
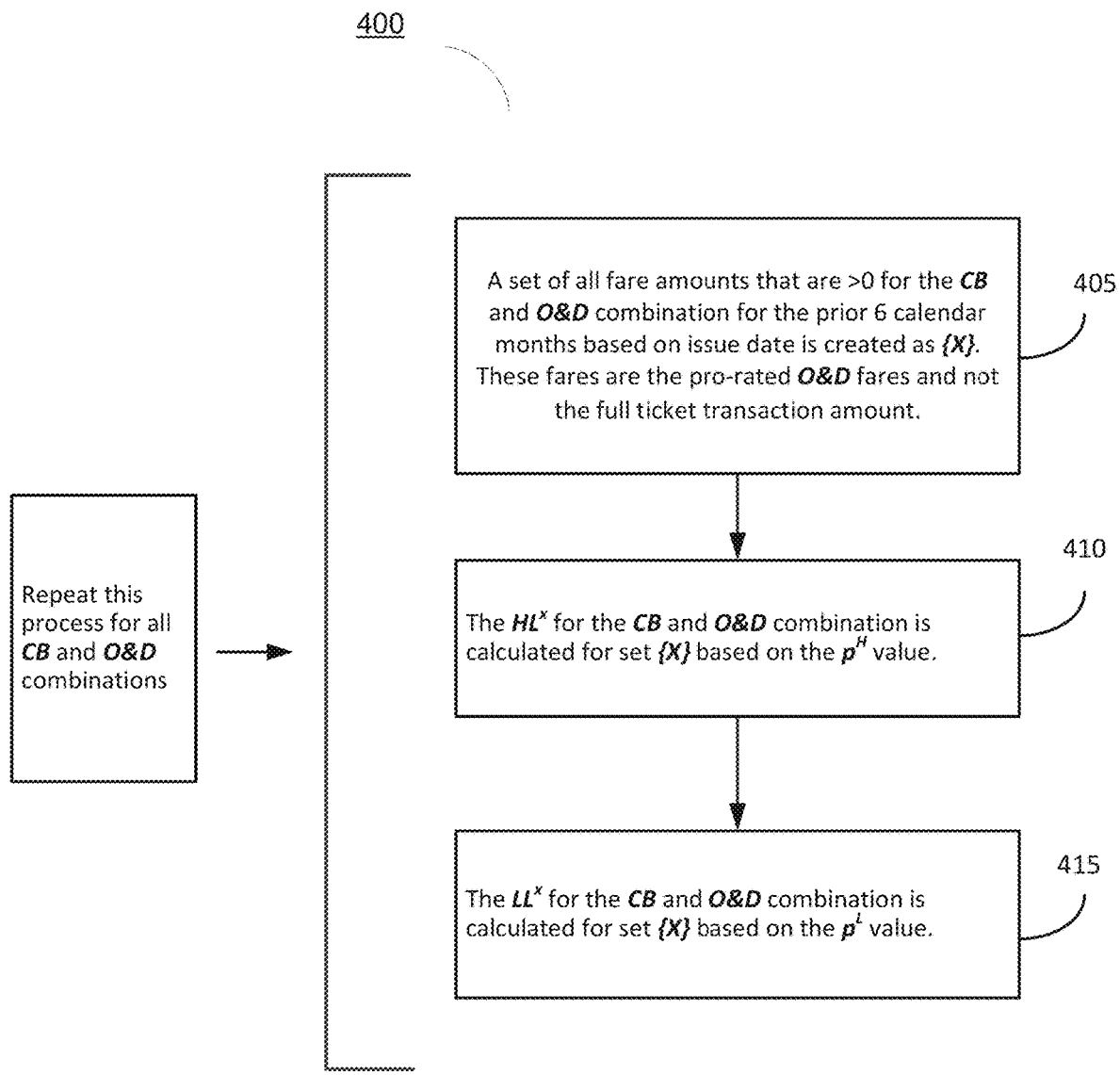
FIG. 4 is a flow diagram depicting an example process of generating high-limit and low-limit values on a periodic basis, according to an illustrative implementation.

FIG. 4 is a flow diagram depicting an example process 400 of generating high-limit and low-limit values on a periodic basis. At operation 405, the process 400 generates a set {X} of all fare amounts that are >0 for the CB and O&D combination for the prior 6 calendar months based on issue date. In some implementations, these fares are the pro-rated O&D fares and not the full ticket transaction amount. At operation 410, the process 400 calculates the HP for the CB and O&D combination for the set {X} based on the $p^H$ value. At operation 415, the process 400 calculates the $LL^x$ for the CB and O&D combination for the set {X} based on the $p^L$ value. The process 400 repeats the operations 405, 410, and 415 for all CB and O&D combinations.

(C) Application of adjustments to transactions.

In some implementations, the adjustment factor application module 230 can be configured to apply adjustments to transactions. In some implementations, this process can be done for each transaction that is loaded. The process can occur in real-time or a batch cycle depending on the type of processing required. For example, in some implementations, the set of adjustment factors {A″} can be randomly selected from the sets previously generated and held constant for some period of time so that there is less risk of detecting the actual adjustment factors and there is higher variability in the adjustments to a sub-set of the population. In some implementations, for most applications of the fare adjustment, the set of adjustment factors {A″} may be held constant for a calendar week of processing, for example.

Figure 5:
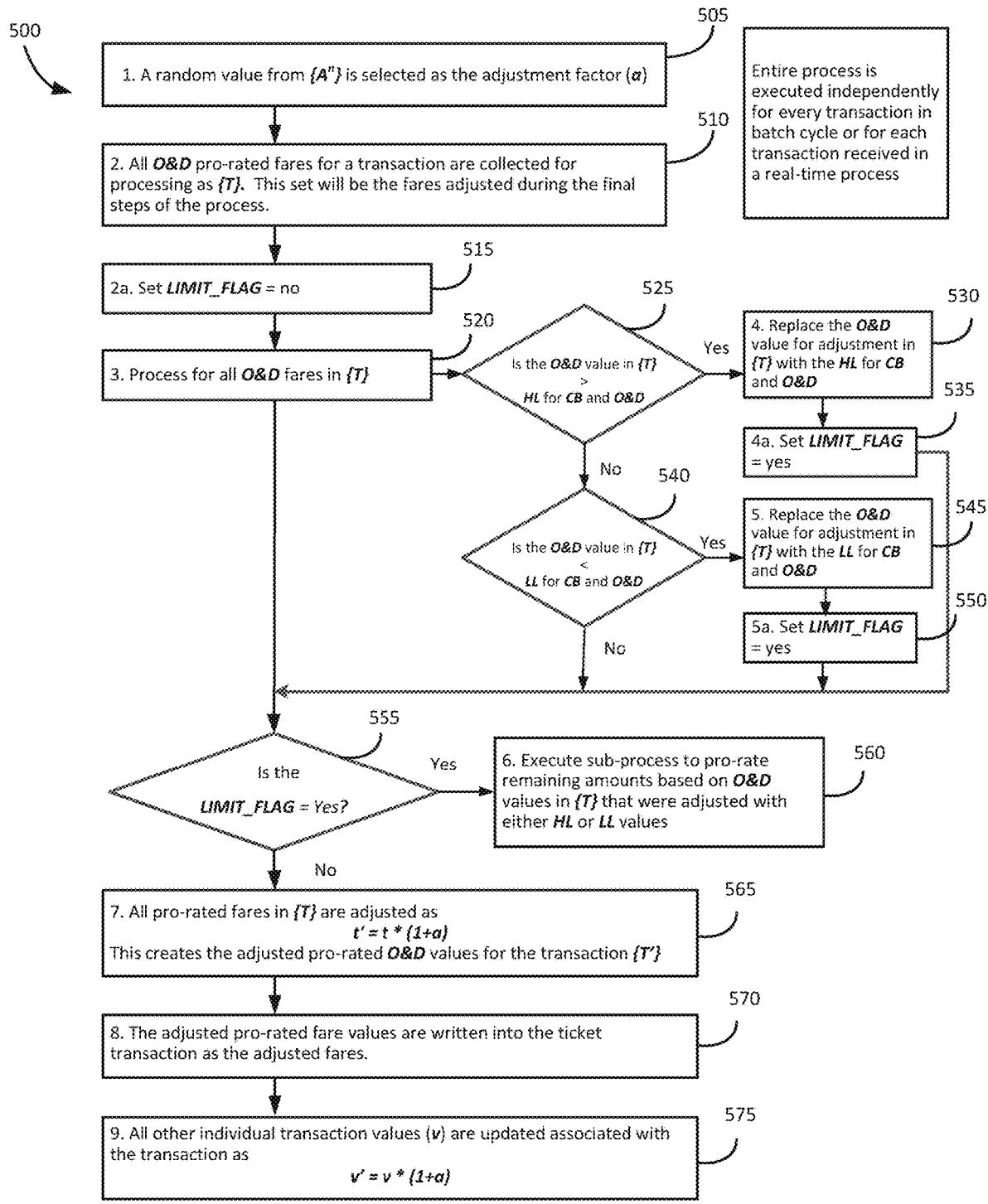
FIG. 5 is a flow diagram depicting an example process of applying adjustments to transactions, according to an illustrative implementation.

FIG. 5 is a flow diagram depicting an example process 500 of applying adjustments to transactions. The operations illustrated in FIG. 5 assume that the selection of {A″} has already been done as a pre-processing step. The entire process is executed independently for every transaction in batch cycle or for each transaction received in a real-time process.

Referring to FIG. 5, at operation 505, the process 500 selects a random value from {A″} as the adjustment factor (a). At operation 510, the process 500 collects all O&D pro-rated fares for a transaction for processing as {T}. This set will be the fares adjusted during the final steps of the process. At operation 515, the process 500 sets a limit_flag to "no." At operation 520, the process 500 processes for all O&D fares in {T} the following operations. If the O&D value in {T} is greater than high limit value HL for CB and O&D (operation 525), the process 500 replaces the O&D value for adjustment in {T} with the high limit value HL for CB and O&D (operation 530), sets limit_flag to "yes" (operation 535), and proceeds to operation 555. On the other hand, if the O&D value in {T} is not greater than high limit value HL for CB and O&D (operation 525), the process 500 checks if the O&D value in {T} is less than the low limit value LL for CB and O&D (operation 540). If the O&D value in {T} is less than the low limit value LL for CB and O&D, the process 500 replaces the O&D value for adjustment in {T} with the low limit value LL for CB and O&D (operation 545), sets limit_flag to "yes" (operation 550), and proceeds to operation 555. On the other hand, if the O&D value in {T} is not less than the low limit value LL for CB and O&D (i.e., the results of both operations 525 and 540 are "no"), the process 500 proceeds to operation 555 without setting the limit_flag to "yes" (i.e., the limit_flag remains as "no").

At operation 555, the process 500 checks if the limit_flag is set to "yes." If the limit_flag is set to "yes," the process 500 executes sub-process to pro-rate remaining amounts based on O&D values in {T} that were adjusted with either HL or LL values (operation 560). On the other hand, if the limit_flag remains as "no," at operation 565, the process 500 adjusts all pro-rated fares in {T} as t'=t*(1+a). This operation creates the adjusted pro-rated O&D values for the transaction {T'}. At operation 570, the process 500 writes the adjusted pro-rated fare values into the ticket transaction as the adjusted fares. At operation 575, the process 500 updates all other individual transaction values (v) associated with the transaction as v'=v*(1+a).

Figure 6:
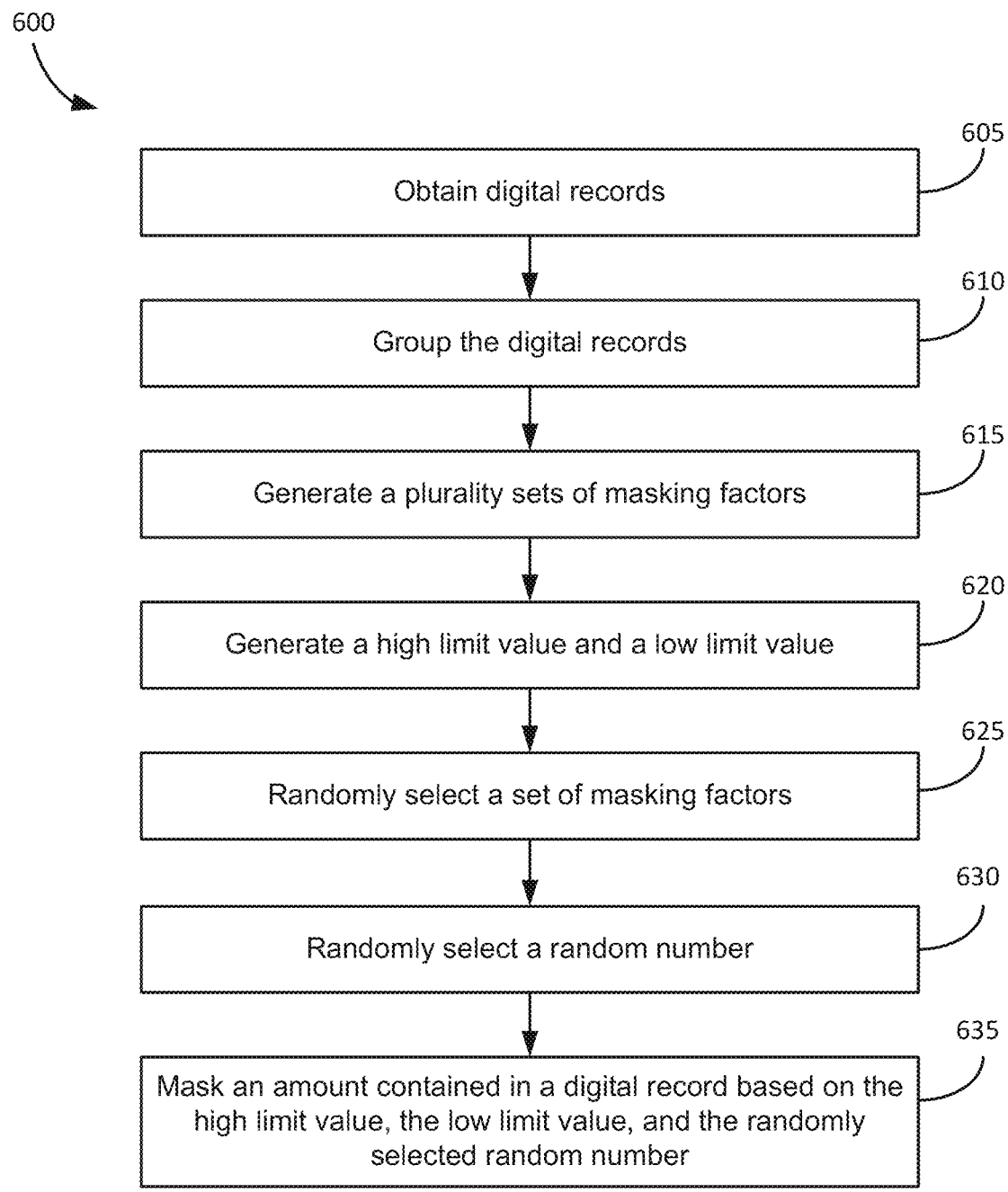
FIG. 6 is a flow diagram depicting an example method of masking data, according to an illustrative implementation.

FIG. 6 is a flow diagram depicting an example method 600 of masking data. In some implementations, the method 600 can include obtaining, by a data masking server comprising at least one processor, a plurality of digital records associated with events, such as transactions, within a predetermined time period (operation 605). For example, the data masking server 115 can obtain digital records associated with transactions within a predetermined time period. In some implementations, digital records can be stored in the database 120 and the data masking server 115 can obtain the digital records from the database 120. In some implementations, the data masking server 115 can obtain the digital records directly from the information providers 125, 130, or 135. In some implementations, the transactions are associated with airline tickets.

In some implementations, the method 600 can include grouping the plurality of digital records into a plurality of groups of digital records based on predetermined criteria (operation 610). For example, the data masking server 115 can group the digital records into a plurality of groups based on a combination of an origin-and-destination criterion and a cabin class criterion in the plurality of digital records.

In some implementations, the method 600 can include generating a plurality sets of masking factors (operation 615) and each set can include a predetermined number of random numbers as the masking factors. For example, the data masking server 115 can generate a plurality sets of masking factors. In some implementations, each set of the masking factors can be generated using a predetermined mean and a predetermined standard deviation over a normal distribution.

In some implementations, the method 600 can include generating a high limit value and a low limit value for a group of digital records among the plurality of groups of digital records (operation 620). For example, the data masking server 115 can generate a high limit value and a low limit value for each of the groups of digital records. In some implementations, the method 600 can include randomly selecting a set of masking factors among the generated plurality sets of masking factors (operation 625). For example, the data masking server 115 can randomly select a set of masking factors. For example, if at operation 615, the data masking server 115 generates 72 (or any other number) sets of masking factors, at operation 625, the data masking server 115 can randomly select a set of masking factors from the 72 sets of masking factors.

In some implementations, the method 600 can include randomly selecting a random number from the randomly selected set of masking factors (operation 630). For example, the data masking server 115 can randomly select a random number from the randomly selected set of masking factors at operation 625. In some implementations, the method 600 can include masking an amount contained in a digital record in the group of digital records based on the high limit value, the low limit value, and the randomly selected random number from the randomly selected set of masking factors (operation 640). For example, the data masking server 115 can mask an amount contained in a digital record in the group of digital records based on the high limit value, the low limit value, and the randomly selected random number from the randomly selected set of masking factors. In some implementations, the amount contained in the digital record includes a fare associated with an airline ticket.

Figure 7:
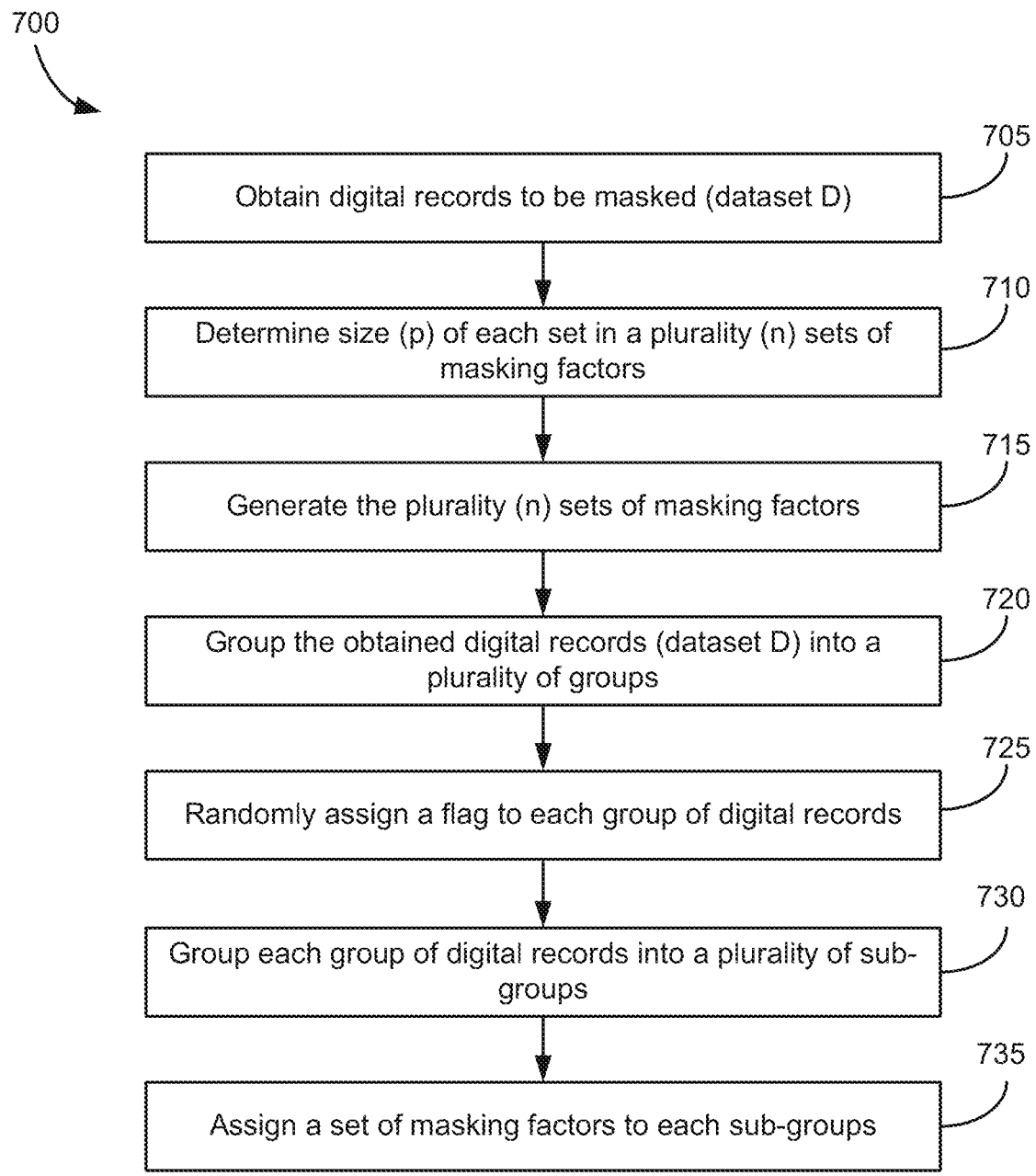
FIG. 7 is a flow diagram depicting an example method of assigning masking factors to digital records for masking data, according to an illustrative implementation.

FIG. 7 is a flow diagram depicting an example method 700 of assigning masking factors to digital records for masking data. For example, the operations in method 700 can be performed by the data masking server 115. In some implementations, the method 700 can include obtaining digital records to be masked (e.g., dataset D is created) (operation 705). For example, the data masking server 115 can obtain digital records to be masked from database 120 or directly from the information providers 125, 130, or 135. In some implementations, all origin-and-destination pairs in a day's (or any other periods such as two days, a week, a month, etc.) worth of data can be collected and randomized into a single large set of numbers for the masking (or adjustment) process (e.g., dataset D is created). For example, all origin-and-destination pairs (e.g., JFK-LAX, MCO- LHR, etc.) occurred on Oct. 1, 2016 can be collected by the data masking system 110 and randomly included (e.g., without ordering) in a single large data set (e.g., dataset D).

In some implementations, the method 700 can include determining the size (p) for each set of masking factors in a plurality (n) sets of masking factors (operation 710). In some implementations, the full dataset (D) is used to determine the number of masking factors (f) that will need to be created. The masking factors can be distributed across a plurality (e.g., n) sets of masking factors (e.g., multiple Factor Sets (FS″)). In some implementations, a plurality (e.g., n) sets of masking factors (e.g., multiple Factor Sets (FS″)) can be created with a total number of factors (f) equal to the population of the dataset D. Each set (e.g., each FS″) can have a fixed population based on a percentage of the total number of digital records (or the amounts in the digital records) to be masked (or adjusted) or the population of the dataset D.

As an example, for a total population of 10,000 records in the dataset D, the data masking server 115 can determine to create n (e.g., 4) sets of masking factors (i.e., 4 sets of FS″). In some implementations, the number of sets (e.g., n) is an even number (e.g., 2, 4, 6, 8, etc.). In these implementations, half of the masking factor sets (FS″) have masking factors with a positive sign (positive masking factors) and half of the masking factor sets (FS″) have masking factors with a negative sign (negative masking factors). For example, sets 2 and 4 ($FS^2$ and $FS^4$) can contain positive masking factors and sets 1 and 3 ($FS^1$ and $FS^3$) can contain negative masking factors.

Continuing with this example, the data masking server 115 can determine that $FS^1$ (set 1) includes a size or population $P^1$ of 50% of the total population (i.e., $P^1$=5,000), $FS^2$ (set 2) includes a size or population $P^2$ of 25% of the total population (i.e., $P^2$=2,500), $FS^3$ (set 3) includes a size or population $P^3$ of 15% of the total population (i.e., $P^3$=1,500), and $FS^4$ (set 4) includes a size or population $P^4$ of 10% of the total population (i.e., $P^4$=1,000).

In some implementations, the method 700 can include generating the plurality (n) sets of masking factors (operation 715). In some implementations, after the number of (n) sets of masking factors and the size of each set of masking factors are determined (in operation 710), the data masking server 115 can create the plurality sets of masking factors (e.g., the actual masking factors in each set are created). In some implementations, each set of masking factors (FS″) can be created by generating a distribution of masking factors with a pre-set mean ($\mu''$) and a standard deviation ($s''$). As described herein above, in some implementations, the masking factors in the even-numbered sets can be positive and the masking factors in the odd-numbered sets can be negative. It should be understood that the association of the even-numbered sets with positive masking factors and the association of the odd-numbered sets with negative masking factors are for illustration purpose only. In other implementations, the masking factors in the even-numbered sets can be negative and the masking factors in the odd-numbered sets can be positive. In some implementations, enough masking factors (f) are created so that there will be no re-use across the factors when the masking factors are applied to the digital records.

In some implementations, for each set of masking factors (FS″), an upper limit and a lower limit are applied so there is a fixed range of masking (or adjustment) factors to prevent outliers from being generated during the masking (or adjustment) process. Each set can have a specific range (R″) applied and if a masking factor outside of this range is created during the process, the masking factor will be eliminated and a replacement masking factor (f) will be substituted. As an example, for a set of masking factors (e.g., $FS^2$), mean ($\mu^2$)=11.05%, standard deviation ($s^2$)=0.01, range ($R^2$)={11.05:14.05}.

In some implementations, the method 700 can include grouping (or separating) the obtained digital records (dataset D) into a plurality of groups of digital records (operation 720). In some implementations, the obtained digital records (dataset D) can be separated into a plurality (m) of groups of digital records or data based on directional or non-directional origin-and-destinations in the dataset D. For example, the plurality of groups of digital records can include a group of JFK-LAX, a group of MCO-LHR, a group of YYZ-MGM, a group of DCA-ORD, a group of SIN-IST, and so on. In some implementations, there are m sets (groups) of digital records generated where m=the number of unique origin-and-destinations in the dataset D.

In some implementations, the method 700 can include randomly assign a flag to each group of digital records (operation 725). In some implementations, the data masking server 115 can randomly assign either a positive flag or a negative flag to each group of digital records for later assigning masking factors. For example, the group of JFK-LAX is assigned a positive flag, the group of MCO-LHR is assigned a positive flag, the group of YYZ-MGM s assigned a negative flag, etc.

In some implementations, the method 700 can include grouping (or separating) each group of digital records into a plurality of sub-groups of digital records (operation 730). In some implementations, the sub-grouping is based on carriers. For example, for the group of JFK-LAX, sub-grouping is made based on whether the carrier is United Airlines, American Airlines, etc. In other implementations, the sub-grouping can be based on other criteria.

In some implementations, the method 700 can include assigning a set of masking factors to each sub-group of digital records (operation 735). In some implementations, if the group of digital records containing the sub-group of digital records has a positive flag (assigned in operation 725), a set of positive masking factors (e.g., even-numbered set) is assigned to the sub-group. If the group of digital records containing the sub-group of digital records has a negative flag (assigned in operation 725), a set of negative masking factors (e.g., odd-numbered set) is assigned to the sub-group.

In some implementations, the set of masking factors (FS″) assigned to each sub-group of digital records is held constant for a specific time period (e.g., one week, two weeks, etc.) In some implementations, if it is a new calendar week, for instance, all sub-groups (or carriers, for example) are extracted from the group of digital records. If it is not at a calendar week boundary, assignments are not re-done. If it is at a calendar week boundary, assignments is done.

Figure 8:
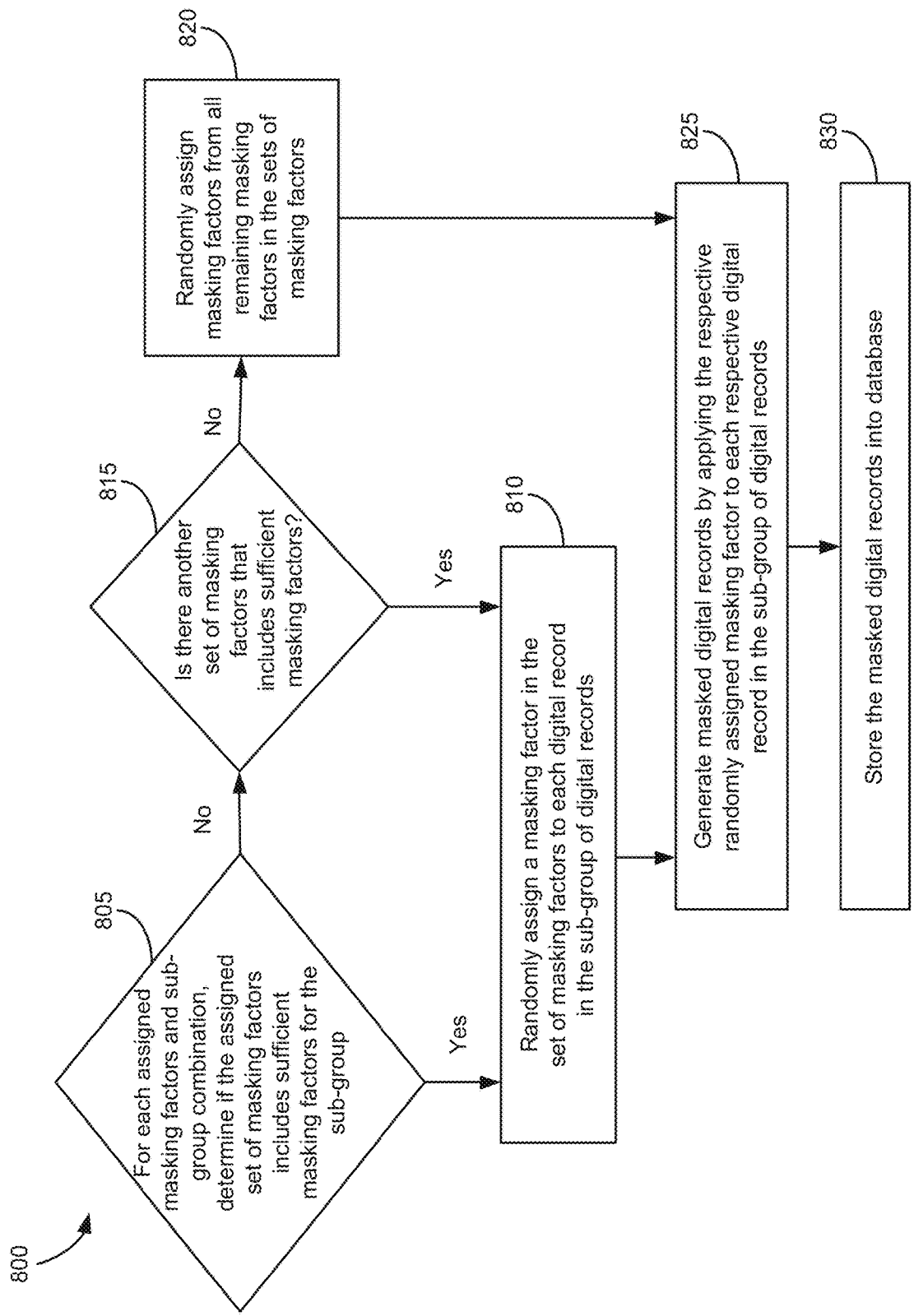
FIG. 8 is a flow diagram depicting an example method of masking data, according to an illustrative implementation.

FIG. 8 is a flow diagram depicting an example method 800 of masking data. For example, the operations in method 800 can be performed by the data masking server 115 for all assigned sub-group of digital records with associated set of masking factors (result of operation 735). In some implementations, the operations in method 800 is done daily for all digital records in dataset D. In some implementations, the method 800 can include for each assigned masking factors and sub-group combination, determining if the assigned set of masking factors includes sufficient masking factors for the sub-group (operation 805). For example, for a sub-group with 1000 digital records, the assigned set of masking factors (result of operation 735) can have 1500 masking factors or 800 masking factors.

In some implementations, if the assigned set of masking factors includes sufficient masking factors (for example, the number of masking factors in the set of masking factors (FS″) is greater than or equal to the number of digital records in the sub-group, e.g., 1500 masking factors vs. 1000 digital records in the example above) for the sub-group (output of operation 805 is Yes), the data masking server 115 can randomly assign a respective masking factor in the assigned (or associated) set of masking factors to each digital record in the sub-group of digital records (operation 810). That is, each digital record in the sub-group of digital records is randomly assigned a different masking factor in the assigned (or associated) set of masking factors such that each digital record in the sub-group of digital records has a unique masking factor.

In some implementations, if the assigned set of masking factors does not include sufficient masking factors (for example, the number of masking factors in the set of masking factors (FS″) is less than the number of digital records in the sub-group, e.g., 800 masking factors vs. 1000 digital records in the example above) for the sub-group (output of operation 805 is No), the data masking server 115 checks if there is another set of masking factors (in the plurality of sets of masking factors) including sufficient masking factors (operation 815). In some implementations, the data masking server 115 randomly selects another set of masking factors (FS″) that has the same sign (positive or negative) with that (positive or negative flag) of the set of digital records containing the subgroup of the digital records. The test in operation 815 is repeated until a set of masking factors (FS″) with the same sign is found. If no set is found with the correct sign, the data masking server 115 randomly selects a FS″ with the opposite sign until one is found.

In some implementations, if the answer to the question in operation 815 is "yes," the found set (i.e., another set) of masking factors is assigned to the sub-groups of digital records and operation 810 is performed. If the answer to the question in operation 815 is "no," the data masking server 115 randomly assigns masking factors from all remaining masking factors in the sets of masking factors (operation 820). In some implementations, masking factors that have been assigned to digital records are removed from the set of masking factors (FS″) so that they are not re-used. Accordingly, in operation 820, the data masking server 115 randomly assigns masking factors from all remaining masking factors in all set of masking factors (FS″) using the original sign (positive or negative) (same sign as the group of digital records containing the sub-group) first, and then using the other sign (opposite sign as the group of digital records containing the sub-group).

In some implementations, the method 800 can include generating masked digital records by applying the respective randomly assigned masking factor to each respective digital record in the sub-group of digital records (operation 825). For example, an amount in each digital record is masked with the respective assigned unique masking factor. In some implementations, the method 800 can include storing the masked digital records generated in operation 825 into a database, such as database 120 (operation 830).

Figure 9:
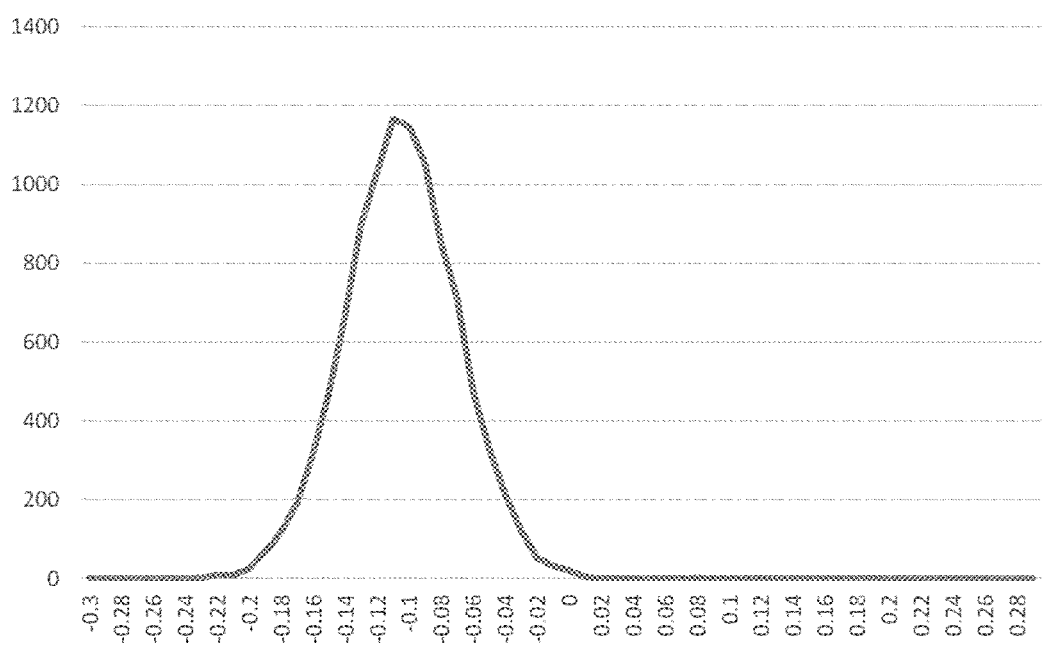
FIG. 9 is an example illustrating a distribution of adjustment factors, according to an illustrative implementation.

FIG. 9 is an example illustrating a distribution of adjustment factors. In this example, assuming there are 10,000 factors, and they are distributed around a mean of –10%, so the biggest number of adjustment factors (~1,200) are clustered there. There may still be a significant number ranging from –18% to –2%, and some may even go to the limits of –30% and +30%. Very few may be that great, but some can be and that may make the reverse engineering of actual fares close to impossible.

Figure 10:
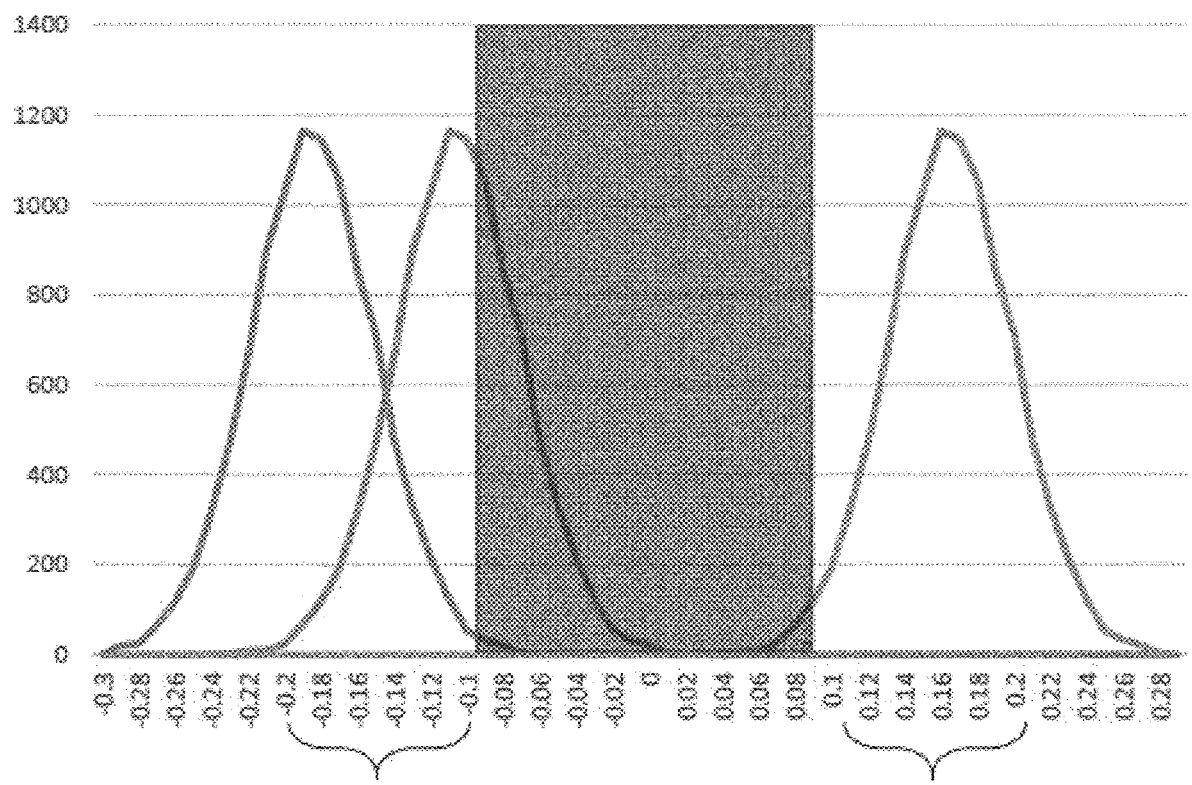
FIG. 10 is an example illustrating the shifting of the mean of the distribution of adjustment factors, according to an illustrative implementation.

FIG. 10 is an example illustrating the shifting of the mean of the distribution of adjustment factors. For example, each week (or month) the curve may shift to a new mean between –0.2:–1 and 0.1:2. Because the mean may never be near zero, actual fares will be much more highly masked. But because the means can shift to either side of zero, the analysis of averages can be much more useful. In this case the three examples have means of –0.18, –0.10, and 0.17 respectively. In the example of FIG. 10, the mean of the distribution factors can be in the left and right with no distribution that has a mean centered around 0.

Figure 11:
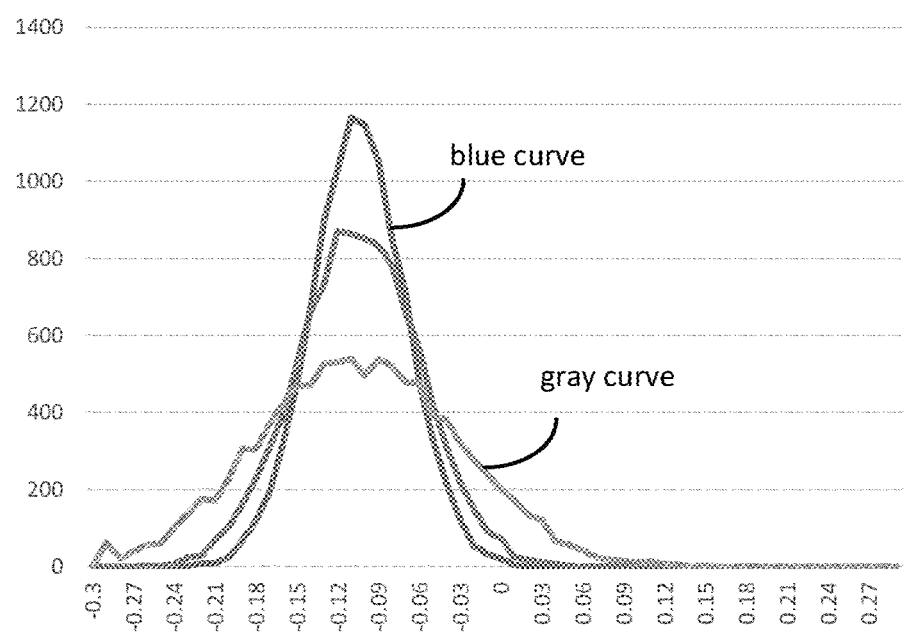
FIG. 11 is an example illustrating that the standard deviation of the normal distribution can be adjusted, according to an illustrative implementation.

FIG. 11 is an example illustrating that the standard deviation of the normal distribution can also be adjusted. The effect of this shift is that a larger standard deviation can make the curve "flatter" and "shorter". The distribution of adjustment factors can be less clustered around the mean as the standard deviation increases. For example in this case, the blue curve can have most of the factors very close while the grey curve can have them in a much larger range. The reason to do this change to the standard deviation is to make it more difficult to reverse engineer any actual amounts while still providing a useful set of data for analysis across many dimensions.

Figure 12:
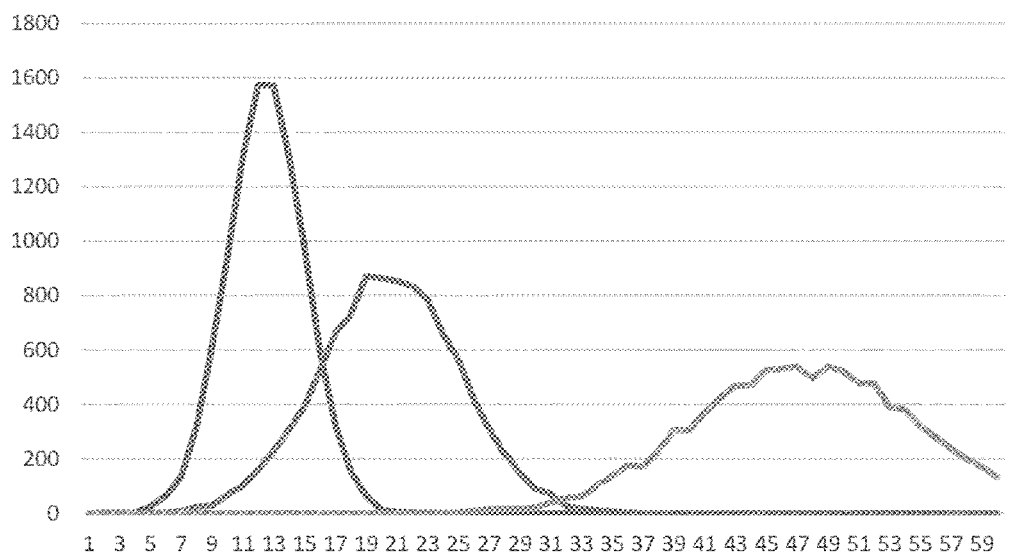
FIG. 12 is an example illustrating a set of distributions for three weeks' worth of factors, according to an illustrative implementation.

FIG. 12 is an example illustrating a set of distributions for three weeks' worth of factors. For example, the mean (left-right shift) and the standard deviation (height and width) can be varied randomly so that the effect can be a wide range of adjustment factors, but can also allow a clustering effect for analysis on many factors. Because individual transactions can be adjusted, analysis can be done on any factor (cabin class, O&D, departure airport, issue date, carrier, etc.) without the need to individually adjust based on the competitive intensity of the market.

Figure 13:
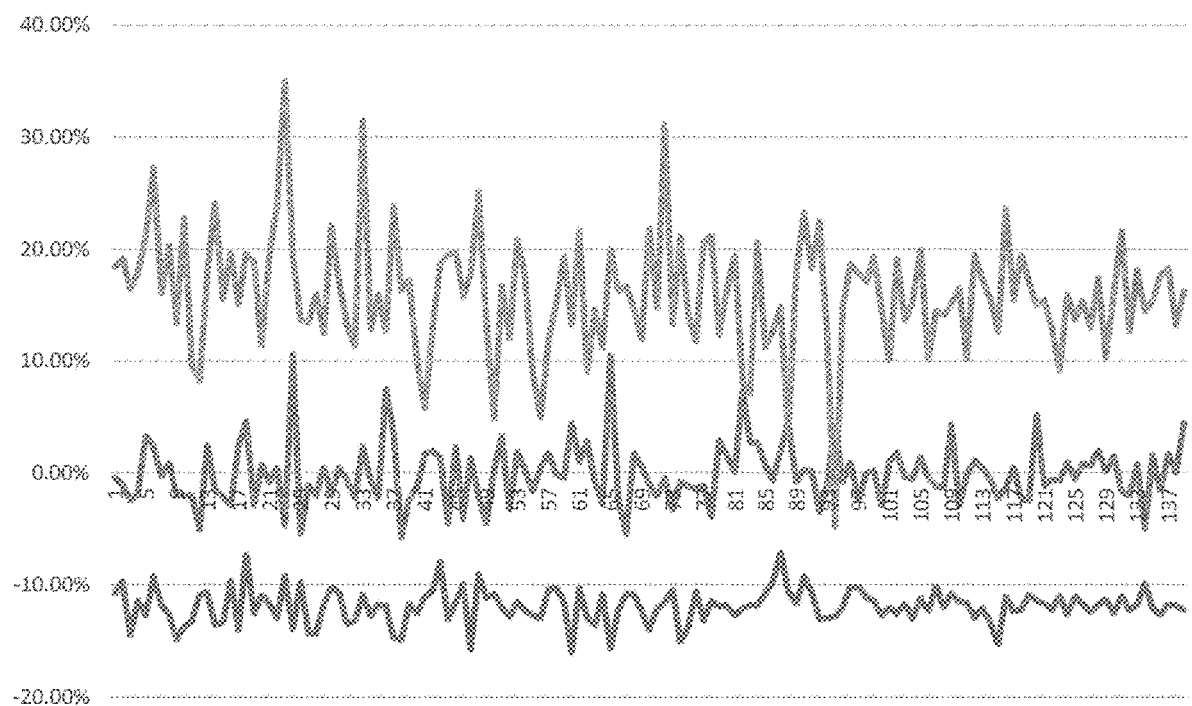
FIG. 13 shows an example view of the actual factors that can be applied for a set of transactions, according to an illustrative implementation.

FIG. 13 shows an example view of the actual factors that can be applied for a set of transactions. As shown in the previous figure, the mean is shifted (3 different values) so they have lines around that percentage adjustment. However, they are also varied around that mean and even overlap in some cases. This overlap effect as more adjustment sets are derived can be the key to masking actual amounts while still producing a useable set of adjusted transactions for analysis.

Figure 14:
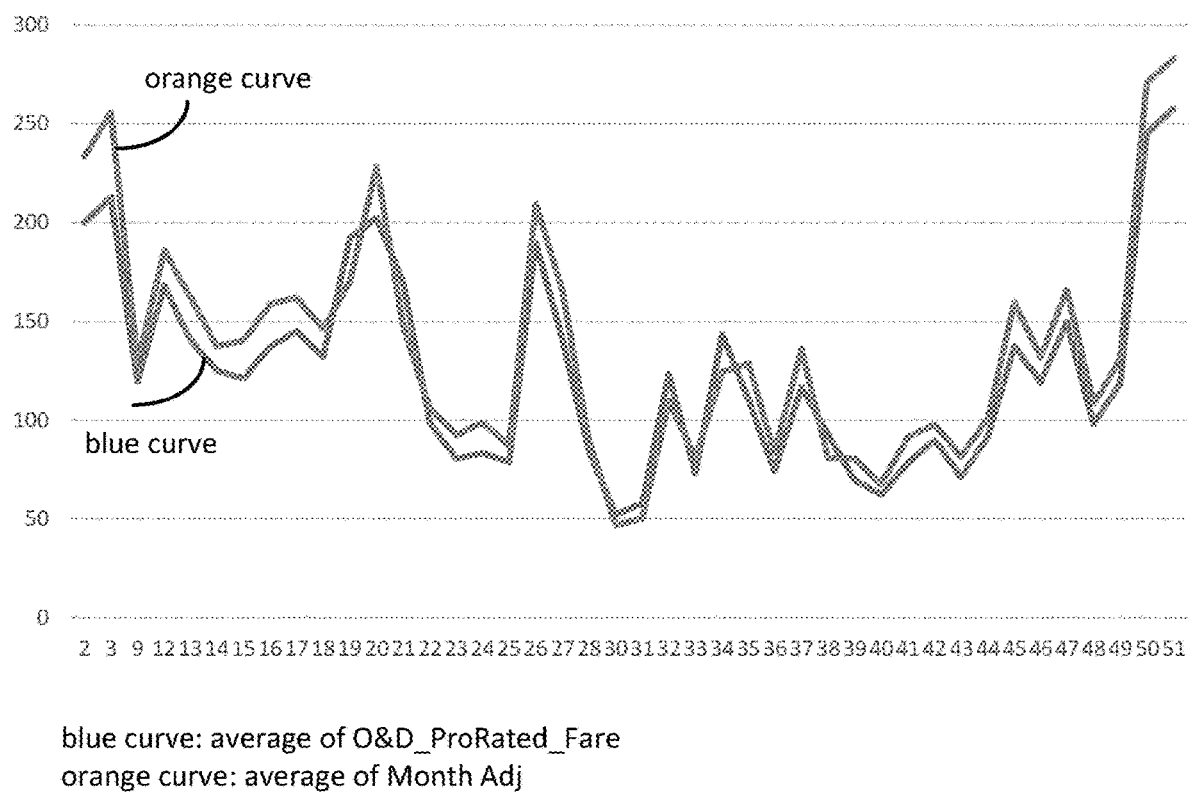
FIG. 14 shows an example of the effect of the adjustment approach, according to an illustrative implementation.

FIG. 14 shows an example of the effect of the adjustment approach. The example is shown for transactions by issue date all departing on a single date. The actual fares are shown in blue and the adjusted fares are shown in the orange curve. Some amounts are adjusted higher and some are adjusted lower, therefore the actual average amount could not be determined. Because of the random selection of sets of values, in some cases a higher percentage will be "up" and in other cases the higher percentage will be "down." Therefore the true average cannot be derived with confidence.

Figure 15:
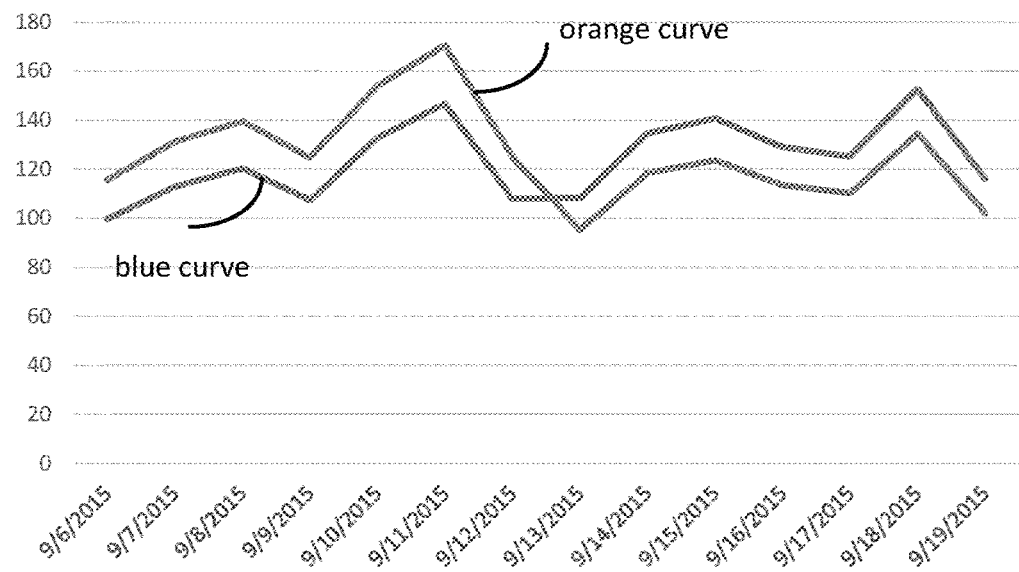
FIG. 15 shows an example of issued tickets regardless of departure date, according to an illustrative implementation.

FIG. 15 shows an example of issued tickets regardless of departure date. In this example, the first set have a higher then actual adjustment, but the later set has a lower adjustment. As the set of factors will be changed weekly, over time this curve will have many adjustment sets/values.

Figure 16:
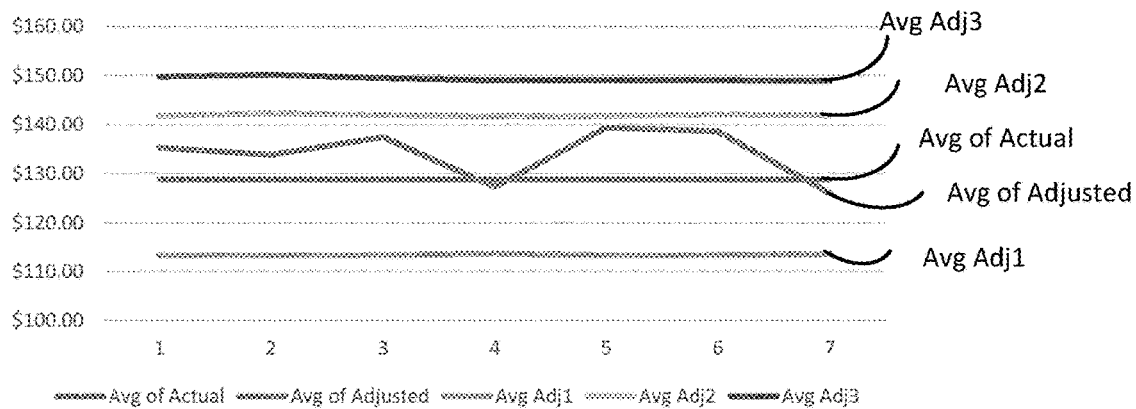
FIG. 16 is an example illustrating the average variance in multiple simulations for actual vs. adjusted fares, according to an illustrative implementation.

FIG. 16 is an example illustrating the average variance in multiple simulations for actual vs. adjusted fares. In this case, 7 different (randomized) sets of adjustments were created. If only one distribution was used, the fares could be derived as shown in the lines being parallel. However, because the adjustment factor distributions are changed, the actual percentage variance are unknown as shown in these 7 actual simulation runs.

The systems and methods described herein can apply an adjustment factor to individual tickets in some implementations. Thus, flexibility can be achieved in multiple analyses (i.e., day-of-week, departure day, high season, etc.). In some implementations, the systems and methods described herein can achieve the objective of providing the individual ticket adjustment without revealing either an actual ticket amount or an actual average amount. In some implementations, adjustment factor is held constant for all the segments in a transaction. This can make the cumulative segment prorated values always add up to the same (adjusted) ticket fare value. In some implementations, proration can be done at the segment level based on mileage. Therefore, there can be no need to consider other factors (e.g., number of carriers) for the fare pro-ration per segment, and only mileage is considered.

In some implementations, transaction amounts can be adjusted based on a random factor from a range of normal distributions of adjustment factors. In some implementations, a single adjustment factor can be applied to all amounts within a transaction. In some implementations, set of adjustment factors is derived based on a normal distribution of factors. The effect is that more factors will be near the mean of the distribution. In some implementations, distribution can be built with a standard deviation within a range [0.25:0.75]. By varying the standard deviation, the true distribution of adjustment factors may be impossible to reverse engineer and determine an actual ticket amount. In some implementations, the mean of the distribution can be shifted between either [−0.20:−0.10] or [+0.10:+0.20] so that the actual average for an airline may be impossible to determine with confidence by other airlines. In some implementations, the distribution of factors within a set of parameters (mean and standard deviation) can be computed in advance for 10,000 factors, then one of the sets of distributions will be randomly selected to be used for adjusting actual amounts. In some implementations, the distribution of factors can be held constant for a week for example, but the random factor can vary by transaction within the set of 10,000 factors. In some implementations, adjustment can be bounded on a min adjustment of −30% and max adjustment of +30% regardless of the factor computed in the distribution to eliminate unreasonable adjustment factors.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software embodied or stored in non-transitory computer-readable medium, or combinations of both. The various illustrative blocks, methods, operations described in connection with the embodiments disclosed herein may be implemented or performed with a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any processors, controllers, microcontrollers, CPU etc. A processor may also be implemented as a combination of computing devices, e.g., a combination of a DSP and a microprocessor, a plurality of microprocessors, one or more microprocessors in conjunction with a DSP core, or any other such configuration.

The steps of a method or operation described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary non-transitory storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software embodied in a non-transitory computer readable medium, firmware, or any combination thereof. Such hardware, software embodied in a non-transitory computer readable medium, firmware, or any combination thereof may part of or implemented with any one or combination of the servers, databases, associated components in the system, components thereof, and/or the like. A computer-readable storage media may be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The present disclosure is described, in part, in the context of masking airline ticket fares as the airline ticket fare being one example of commercially sensitive data. For example, airlines that are not the issuer of a ticket or are not party to the transaction in some way should not be able to view actual fares for an airline ticket. These airlines that should not have the visibility to actual fares may be referred to as other airlines. Sharing actual ticket values with other airlines could be viewed as too transparent by both airlines and regulators. While embodiments described herein may be implemented in the context of masking airline ticket fares, it should be recognized that the exemplary systems and method as described herein can be used in data masking for other personal and commercially sensitive data.

The invention claimed is:

1. A method of masking data, comprising:
   obtaining, by a data masking server comprising at least one processor coupled to memory, a plurality of digital records associated with events within a predetermined time period;
   grouping, by the data masking server, the plurality of digital records into a plurality of groups of digital records based on predetermined criteria;
   generating, by the data masking server, a plurality sets of masking factors, wherein each set includes a predetermined number of random numbers as the masking factors;
   generating, by the data masking server, a first limit value and a second limit value for a group of digital records among the plurality of groups of digital records, the first limit value greater than the second limit value;
   randomly, by the data masking server, selecting a set of masking factors among the generated plurality sets of masking factors;
   randomly, by the data masking server, selecting a random number from the randomly selected set of masking factors; and
   masking, by the data masking server, an amount contained in a first digital record in the group of digital records based on the first limit value, the second limit value, and the randomly selected random number from the randomly selected set of masking factors.

2. The method of claim 1, wherein the events are associated with airline records, and wherein the amount contained in the first digital record comprises numerical data associated with an airline record.

3. The method of claim 1, wherein generating the plurality sets of masking factors comprises:
   generating a set of masking factors using a predetermined mean and a predetermined standard deviation over a normal distribution.

4. The method of claim 1, further comprising:
   determining that the amount contained in the first digital record is below the first limit value and above the second limit value; and
   generating, responsive to determining that the amount contained in the first digital record is below the first limit value and above the second limit value, a masked amount for the amount contained in the first digital record by applying the randomly selected random number from the randomly selected set of masking factors to the amount contained in the first digital record.

5. The method of claim 1, further comprising:
   determining that an amount contained in a second digital record in the group of digital records is above the first limit value; and
   generating a masked amount for the amount contained in the second digital record by setting the masked amount to the first limit value.

6. The method of claim 1, further comprising:
   determining that an amount contained in a third digital record in the group of digital records is below the second limit value; and
   generating a masked amount for the amount contained in the third digital record by setting the masked amount to the second limit value.

7. The method of claim 1, wherein the plurality of digital records are grouped based on a combination of an origin-and-destination criterion and a cabin class criterion in the plurality of digital records.

8. A system of masking data, comprising:
   at least one server comprising one or more processors coupled to memory, the at least one server configured to:
   obtain a plurality of digital records associated with events within a predetermined time period;
   group the plurality of digital records into a plurality of groups of digital records based on predetermined criteria;
   generate a plurality sets of masking factors, wherein each set includes a predetermined number of random numbers as the masking factors;
   generate, from amounts contained in the plurality of digital records, a first limit value and a second limit value for a group of digital records among the plurality of groups of digital records the first limit value greater than the second limit value;
   randomly select a set of masking factors among the generated plurality sets of masking factors;
   randomly select a random number from the randomly selected set of masking factors; and
   mask an amount contained in a first digital record in the group of digital records based on the first limit value, the second limit value, and the randomly selected random number from the randomly selected set of masking factors.

9. The system of claim 8, wherein the events are associated with airline records, and wherein the amount contained in the first digital record comprises numerical data associated with an airline record.

10. The system of claim 8, further comprising the at least one server configured to:
    generate a set of masking factors using a predetermined mean and a predetermined standard deviation over a normal distribution.

11. The system of claim 8, further comprising the at least one server configured to:
    determine that the amount contained in the first digital record is below the first limit value and above the second limit value; and
    generate, responsive to determining that the amount contained in the first digital record is below the first limit value and above the second limit value, a masked amount for the amount contained in the first digital record by applying the randomly selected random number from the randomly selected set of masking factors to the amount contained in the first digital record.

12. The system of claim 8, further comprising the at least one server configured to:
    determine that an amount contained in a second digital record in the group of digital records is above the first limit value; and
    generate a masked amount for the amount contained in the second digital record by setting the masked amount to the first limit value.

13. The system of claim 8, further comprising the at least one server configured to:
    determine that an amount contained in a third digital record in the group of digital records is below the second limit value; and
    generate a masked amount for the amount contained in the third digital record by setting the masked amount to the second limit value.

14. The system of claim 8, wherein the plurality of digital records are grouped based on a combination of an origin-and-destination criterion and a cabin class criterion in the plurality of digital records.

15. A non-transitory computer-readable medium having machine instructions stored therein, the instructions when executed by at least one processor, causing the at least one processor to perform operations comprising:

obtaining a plurality of digital records associated with events within a predetermined time period;

grouping the plurality of digital records into a plurality of groups of digital records based on predetermined criteria;

generating a plurality sets of masking factors, wherein each set includes a predetermined number of random numbers as the masking factors;

generating, from amounts contained in the plurality of digital records, a first limit value and a second limit value for a group of digital records among the plurality of groups of digital records the first limit value greater than the second limit value;

randomly selecting a set of masking factors among the generated plurality sets of masking factors;

randomly selecting a random number from the randomly selected set of masking factors; and masking an amount contained in a first digital record in the group of digital records based on the first limit value, the second limit value, and the randomly selected random number from the randomly selected set of masking factors.

16. The non-transitory computer-readable medium of claim 15, wherein the events are associated with airline records, and wherein the amount contained in the first digital record comprises numerical data associated with an airline record.

17. The non-transitory computer-readable medium of claim 15, wherein the instructions when executed by the at least one processor, causing the at least one processor to perform operations further comprising:

generating a set of masking factors using a predetermined mean and a predetermined standard deviation over a normal distribution.

18. The non-transitory computer-readable medium of claim 15, wherein the instructions when executed by the at least one processor, causing the at least one processor to perform operations further comprising:

determining that the amount contained in the first digital record is below the first limit value and above the second limit value; and generating, responsive to determining that the amount contained in the first digital record is below the first limit value and above the second limit value, a masked amount for the amount contained in the first digital record by applying the randomly selected random number from the randomly selected set of masking factors to the amount contained in the first digital record.

19. The non-transitory computer-readable medium of claim 15, wherein the instructions when executed by the at least one processor, causing the at least one processor to perform operations further comprising:

determining that an amount contained in a second digital record in the group of digital records is above the first limit value;

generating a masked amount for the amount contained in the second digital record by setting the masked amount to the first limit value;

determining that an amount contained in a third digital record in the group of digital records is below the second limit value; and generating a masked amount for the amount contained in the third digital record by setting the masked amount to the second limit value.

20. The non-transitory computer-readable medium of claim 15, wherein the plurality of digital records are grouped based on a combination of an origin-and-destination criterion and a cabin class criterion in the plurality of digital records.

* * * * *